United States Patent [19]
Yamasaki et al.

[11] 3,756,078
[45] Sept. 4, 1973

[54] CURRENT METER OR FLOW METER

[75] Inventors: Hiroo Yamasaki; Masanori Noguchi, both of Tokyo, Japan

[73] Assignee: Kabushikikaisha Yokogama Denki Seisakusho (Yokogawa Electric Works, Ltd.), Tokyo, Japan

[22] Filed: June 29, 1970

[21] Appl. No.: 50,372

[52] U.S. Cl. ............... 73/194 B, 73/194 A
[51] Int. Cl. .................. G01f 1/00, G01p 5/00
[58] Field of Search ............ 73/194 A, 194 B, 73/194 C

[56] References Cited
UNITED STATES PATENTS

| | | | |
|---|---|---|---|
| 3,564,915 | 2/1971 | Tomota et al. | 73/194 B |
| 3,680,375 | 8/1972 | Joy et al. | 73/194 B |
| 2,813,424 | 11/1957 | Liepmann et al. | 73/194 B X |
| 3,214,728 | 10/1965 | Higgins | 73/170 A UX |
| 3,116,639 | 1/1964 | Bird | 73/194 B |
| 3,042,899 | 7/1962 | Kendall et al. | 73/133 R UX |
| 3,108,032 | 10/1963 | Carlson | 73/133 R UX |
| 3,327,806 | 6/1967 | Anderson | 73/194 A UX |
| 3,392,574 | 7/1968 | Lemon et al. | 73/53 |
| 2,733,597 | 2/1956 | Hardy | 73/71.4 |
| 3,525,976 | 8/1970 | Wilcox et al. | 73/194 A X |

FOREIGN PATENTS OR APPLICATIONS

| | | | |
|---|---|---|---|
| 1,905 | 12/1966 | Japan | 73/194 C |
| 231,518 | 11/1960 | Australia | 73/290 V |

*Primary Examiner*—Charles A. Ruehl
*Attorney*—Hill, Sherman, Meroni, Gross and Simpson

[57] ABSTRACT

A current meter or flow meter having a vortex generating rod immersed in a fluid stream and in which an ultrasonic signal is transmitted through said fluid stream and, detected with the said transmitter and receiver being disposed on the downstream side of said rod. The ultrasonic wave emitted from said transmitter passes through the fluid transversely of the direction of flow of the fluid stream.

6 Claims, 27 Drawing Figures

Patented Sept. 4, 1973

INVENTORS
Hiroo Yamasaki
Masanori Noguchi

BY *[signature]* ATTORNEYS

INVENTORS
Hiroo Yamasaki
Masanori Noguchi

Patented Sept. 4, 1973

INVENTORS
Hiroo Yamasaki
Masanori Noguchi

BY Hill, Sherman, Meroni, Gross & Simpson ATTORNEYS

Patented Sept. 4, 1973                                                            3,756,078

INVENTORS
Hiroo Yamasaki
Masanori Noguchi

BY *Hill, Sherman, Meroni, Gross & Simpson* ATTORNEYS

CURRENT METER OR FLOW METER

BACKGROUND OF THE INVENTION

1. Field of the Invention

The invention relates to a flow meter utilizing the Karman vortex street, and more particularly to a device for detecting the Karman vortices.

2. Description of the Prior Art

Figure 1:
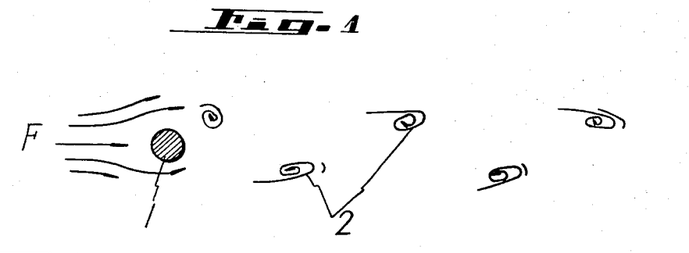
FIG. 1 shows the mode of formation of the Karman vortices in the wake of an object or obstacle.

It is well known that when a cylindrical object 1 is immersed in a fluid stream F as shown in FIG. 1, inward-spinning vortices 2 tend to be formed on the downstream side of the cylindrical object 1 at regular intervals and that vortices 2 are shed from the cylindrical object 1 in two staggered-parallel rows and are carried downstream. These rows of vortices are called the Karman vortex street. The growth and shed cycle of the vortices occurs alternately on either side of the cylindrical object in a periodic fashion, so that the wake flow pattern comprises a staggered arrangement of vortices trails. It is also well known that these vortices are shed downstream at a frequency determined by the flow velocity or flow rate.

Based upon this knowledge, flow measuring devices have been proposed which detect the number of pressure of velocity variations due to the vortices by positioning a sensor such as a hot wire on the downstream side of the object to measure the velocity of the flow or the quantity of the flow of the fluid. Such devices are called hot wire anemometers.

However, according to the prior art devices since the detecting element such as a hot wire is directly immersed in the liquid to be measured, there are problems such as how to prevent the hot wire from corroding and to prolong the life of the device.

SUMMARY OF THE INVENTION

One object of the present invention is to provide a current meter or flow meter free from the drawbacks encountered in the prior art.

Another object of the present invention is to provide a current meter or flow meter which employs means for detecting the number of shed vortices without utilizing a probe which contacts the fluid and which measures the fluid flow velocity or flow rate.

Other objects, features and advantages of the present invention will be apparent from the following description taken in conjunction with the accompanying drawings in which like reference numerals represent like elements.

DESCRIPTION OF THE PREFERRED EMBODIMENTS

Figure 2A:
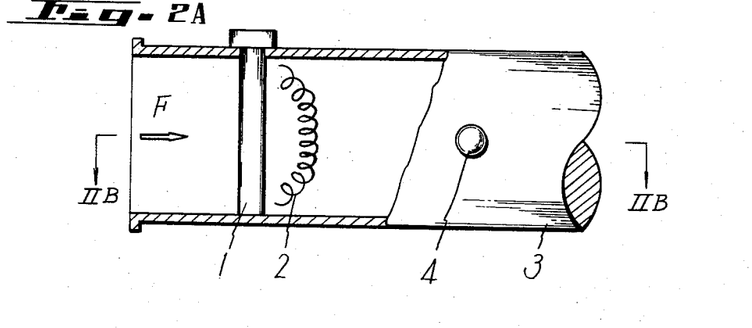
FIG. 2A is a schematic diagram, partially in cross-section, for illustrating one example of the present invention.
Figure 2B:
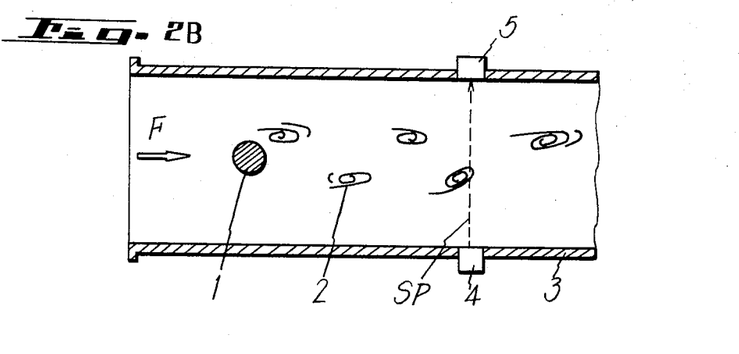
FIG. 2B is a cross-sectional view along the line IIB—IIB in FIG. 2A.

In FIGS. 2A and 2B reference numeral 1 designates a cylindrical object or obstacle of circular cross-section which is immersed in a fluid F with its longitudinal axis substantially at right angles to the direction of the flow of the fluid F. The object 1 will hereinafter be referred to "vortex generating rod." Reference numeral 2 represents inward-spinning vortices, which are called Karman vortices, shed from behind the vortex generating rod 1 mounted in the conduit or pipe 3 through which the fluid F flows. Reference numeral 4 designates an ultrasonic signal transmitter mounted on the conduit 3 on the downstream side of the vortex generating rod 1 for emitting a beam of ultrasonic signals into the fluid. An ultrasonic signal receiver 5 is mounted on the conduit 3 opposite the ultrasonic signal transmitter 4 for receiving the ultrasonic signals emitted from the ultrasonic signal transmitter 4. The transmitter 4 and the receiver 5 are mounted so that a line connecting the transmitter 4 and the receiver 5 at substantially right angles to the direction of the flow of the fluid F and also to the longitudinal axis of the vortex generating rod 1. The transmitter 4 and the receiver 5 constitute a device for detecting the number of the shed vortices passing down the pipe per unit time.

Figure 3:
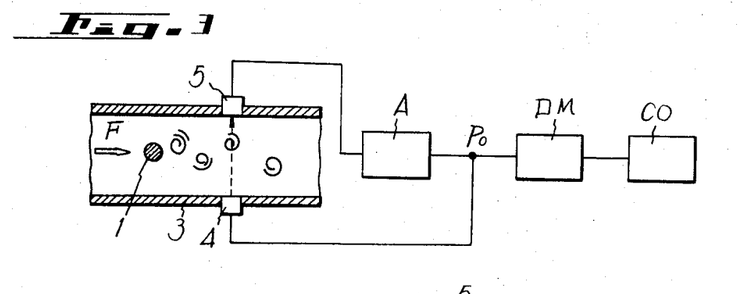
FIG. 3 is a schematic diagram for illustrating the present invention in which electric circuits are incorporated in the example depicted in FIGS. 2A and 2B.

FIG. 3 is a schematic diagram showing electric circuits connected to the embodiment depicted in FIGS. 2A and 2B. In FIG. 3 an electronic circuit A, includes a pulse generator and an amplifier which supplies a signal to a demodulator DM for frequency modulation (FM) signals. A counter CO receives the output of the demodulator DM. The electronic circuit A supplies a pulse signal to the ultrasonic transmitter 4 which emits an ultrasonic signal that passes through the fluid and is received by the receiver 5. The electronic circuit A supplies a new pulse signal to the transmitter 4 when it receives a signal from the receiver 5. If the above operation is repeated, a periodic signal Po occurs at the output terminal of the electronic circuit A. The repetition frequency of the signal Po is proportional to the reciprocal of the time which is required for the ultrasonic signal emitted from the transmitter 4 to travel the distance between the transmitter 4 and the receiver 5 in the fluid F. This method is called the "sing-around" method and the frequency of the signal Po obtained at the output terminal of the electronic circuit A is referred to as the "sing-around frequency".

Figure 4A:
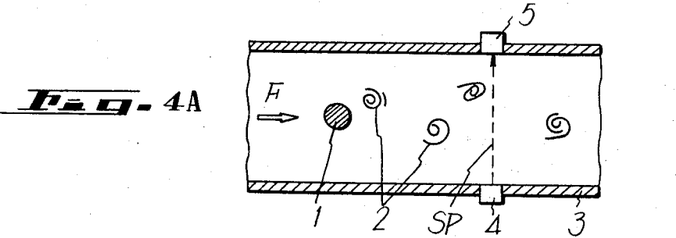
FIGS. 4A, 4B, and 4C, inclusive, are schematic diagrams for explaining the operation of the example depicted in FIGS. 2A and 2B.
Figure 4B:
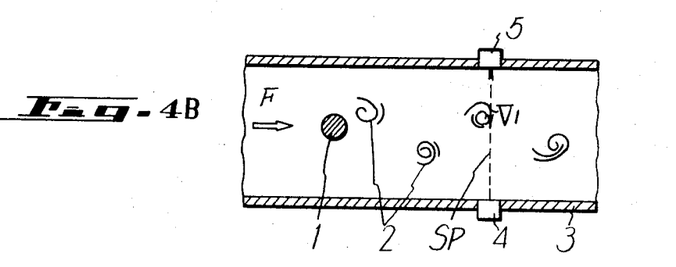
Figure 4C:
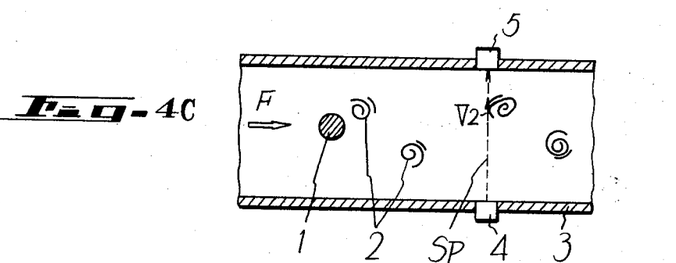

The operation of the present invention will be explained in connection with FIGS. 4A, 4B and 4C.

Ultrasonic signals travel in medium at a constant speed as well known. However, if the medium is flowing with a velocity component in the direction of travel of the ulstrasonic signal, the speed of the ultrasonic signal in the medium varies in accordance with the magnitude and direction of the velocity component of the medium.

a. If no vortex 2 exists in the ultrasonic signal path SP between the transmitter 4 travels and the receiver 5 as shown in FIG. 4A, there is no velocity component of the flow of the medium which has a direction coincident with that of the ultrasonic beam signal and the time $\tau_0$ of travel of the ultrasonic signal from the transmitter 4 to the receiver 5, over the path SP is obtained by the following equation (1):

$$\tau_0 = D/V \tag{1}$$

where V represents the velocity of the ultrasonic signal in the medium F and D the length of the path SP, which is the distance between the transmitter 4 and the receiver 5.

b. In the case of a vortex 2 in the path SP and where the direction of the velocity component of the vortex 2 is directed from the receiver side toward the transmitter side as shown in FIG. 4B at $V_1$, the time $\tau_1$ for the ultrasonic signal to travel between the transmitter 4 and the receiver 5 through the medium is obtained by the following equation (2):

$$\tau_1 = d/(V - V_1) + (D - d)/V \tag{2}$$

where $d$ represents the equivalent diameter of the Karman vortex 2.

c. Further in the case when the vortex 2 flows downward from the position shown in FIG. 4B to the position shown in FIG. 4C, the direction of the velocity component of the vortex 2 will be reversed relative to FIG. 4B as shown by $V_2$ in FIG. 4C. In this case the time $\tau_2$ of travel of the signal through the path SP is expressed by the following equation (3):

$$\tau_2 = d/(V + V_2) + (D - d)/V \tag{3}$$

As apparent from equations (1), (2) and (3) the time $\tau$ for the ultrasonic signal to travel the path SP increases or decreases relative to time $\tau_0$ as a reference due to the Karman vortex passing across the path SP through which the ultrasonic wave passes in the medium.

Figure 5:
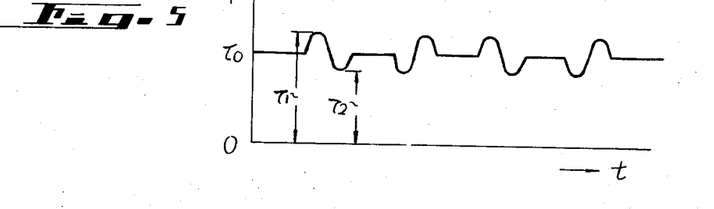
FIG. 5 is a graph showing the output wave form obtained from the example shown in FIG. 3.

FIG. 5 is a graph showing the relationship between the time $\tau$ of the ultrasonic signal travelling over the path SP and time t. The number of time variations of time $\tau$ per unit time is equal to the number of vortices passing across the path SP, and thus to the number of vortices produced by the vortex generating rod 1.

Accordingly, it will be understood that the output signal Po provided at the output terminal of the electronic circuit A shown in FIG. 3 changes in frequency in accordance with the number of variations of the time $\tau$ of the ultrasonic signal which travels over the path SP. In other words the signal Po which is frequency-modulated by the number of the Karman vortices flowing down across the path SP is obtained at the output terminal of the electronic circuit A. The signal Po is frequency-modulated by the number of the Karman vortices passing across the path SP and is demodulated by the FM signal demodulator DM and the output from the FM signal demodulator DM is fed to the counter CO to measure the fluid flow velocity or flow rate. The indication of the counter Co is directly proportional to velocity.

Figure 6A:
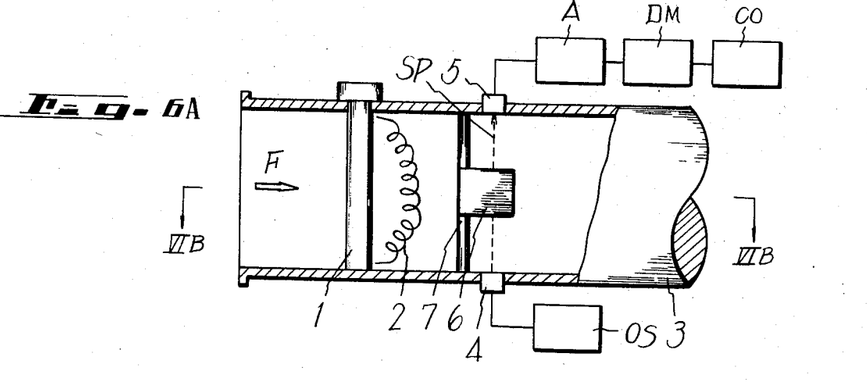
FIG. 6A is a schematic diagram, partially in cross-section, for illustrating another embodiment of the present invention.
Figure 6B:
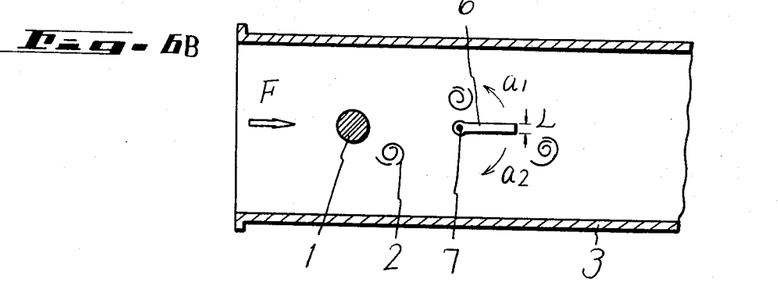
FIG. 6B is a cross-sectional view along the line VIB—VIB in FIG. 6A.

FIG. 6 shows another embodiment of the present invention. In the figure reference numeral 1 designates a vortex generating rod similar to that of the example of FIG. 4. The vortex generating rod 1 is immersed in the fluid F (medium). A vibrator 6 of plate like configuration is mounted on a shaft 7 for vibration and is constructed of material capable of reflecting ultrosonic energy. The shaft 7 is mounted in the conduit 3 on the downstream side of the rod 1 so that its axis is substantially parallel with that of the rod 1. The thickness L of the vibrator 6 is selected to be greater than the diameter of the ultrasonic signal beam, so that when the vibrator 6 rests in the position shown in FIG. 6B the ultrasonic signal emitted from the transmitter 4 is prevented by the vibrator 6 from reaching to the receiver 5. The vibrator 6 oscillates on the shaft 7 in the direction shown by arrows $a_1$ or $a_2$ (shown in FIG. 6B) due to the vortices generated by the vortex generating rod 1. In this case the number of vibrations of the vibrator 6 is directly proportional to the number of vortices formed by the vortex generating rod 1, which is the number of Karman vortices. In this example the ultrasonic signal transmitter 4 and the ultrasonic signal receiver 5 are mounted on the conduit 3 on the downstream side of the rod 1 in such a manner that a line connecting the transmitter 4 and the receiver 5 is substantially parallel with the axis of the shaft 7 and the ultrasonic signal beam emitted from the transmitter 4 is reflected by the vibrator 6 on the side opposite to the transmitter 4 when the vibrator 6 is positioned as shown in FIG. 6B.

When the vibrator 6 is rotated in the directions $a_1$ or $a_2$ by the Karman vortex 2 and deviates from the path SP, the ultrasonic signal emitted from the transmitter 4 arrives at the receiver 5, while when the vibrator 6 returns to its middle position from its deviated position, and the vibrator 6 is positioned on the path SP as shown in FIG. 6B, the ultrasonic signal from the transmitter 4 is reflected by the vibrator 6 and prevents the ultrasonic signal from reaching the receiver 5. The vibrator 6 moves back and forth in accordance with the Karman vortices.

Figure 7A:
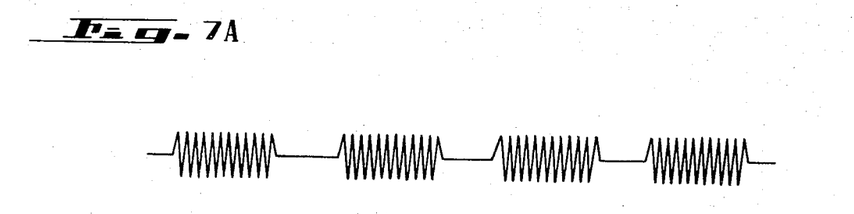
FIGS. 7A and 7B are graphs showing the output wave forms obtained from the example depicted in FIGS. 6A and 6B.
Figure 7B:
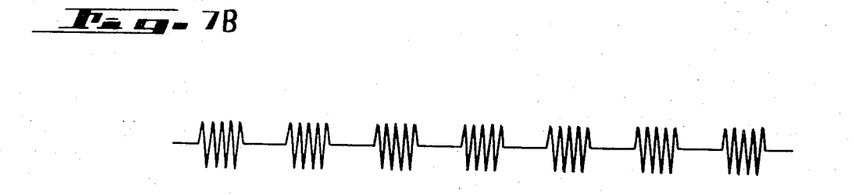

If pulse signals are sequentially supplied to the ultrasonic signal transmitter 4 from a pulse signal generator OS to sequentially produce ultrasonic pulse signals such from the transmitter 4 to the receiver 5, output signals shown in FIG. 7A and 7B are obtained at the output terminal of the receiver 5. The output signals of the receiver 5 are interrupted signals which are interrupted proportional to the number of oscillations of the vibrator 6.

The output signal of the receiver 5 shown in FIG. 7A is obtained in the case where the velocity of the flow of the fluid ( medium ) F is low or the number of vibrations of the vibrator 6 is comparatively small.

The output signal of the receiver 5 shown in FIG. 7B occurs when the velocity of the flow of the fluid is high or the number of vibrations of the vibrator 6 is comparatively great.

It will be, therefore, apparent that the velocity of the flow of the fluid or the quantity of the flow can be measured by counting the number of interruptions of the output signals of the receiver 5. Reference characters A, DM and CO in FIG. 6A respectively correspond to those shown in the FIG. 3 example and count the number of interruptions of the output signal of the receiver 5.

Figure 8:
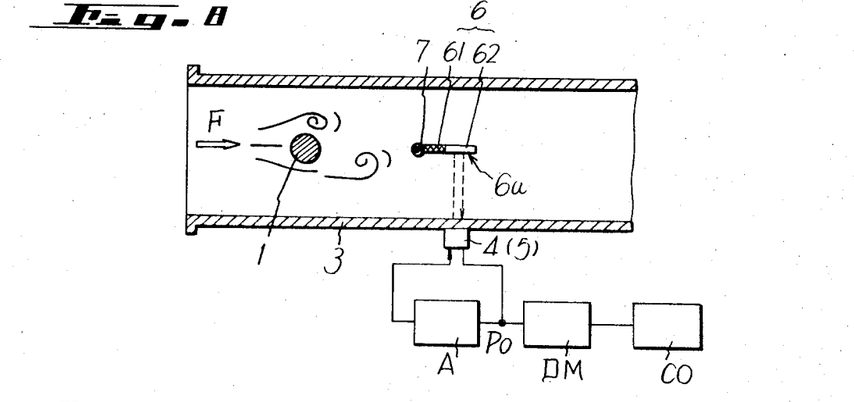
FIG. 8 is a schematic diagram for illustrating a further embodiment of the present invention.

FIG. 8 shows another embodiment of the present invention in which the vortex generating rod 1, the shaft 7 and the vibrator 6 are similarly mounted on the conduit 3 as in FIGS. 6A and 6B. However, the ultrasonic signal transmitter 4 and the receiver 5 for receiving the ultrasonic signal from the transmitter 4 are mounted together on the same side of conduit 3 at a position opposite to one side 6a of the vibrator 6. The vibrator 6 consists of parts 61 and 62, the part 61 being near the shaft 7 and made of material which can not reflect the ultrasonic signal and the part 62 being a part contiguous to the part 61 and made of material which reflects the ultrasonic signal. The electronic circuit A includes a pulse generator and an amplifier supplies a pulse to the transmitter 4 which transmits ultrasonic signals. The ultrasonic signal emitted from the transmitter 4 is directed toward the vibrator 6 and the reflected ultrasonic signal from the vibrator 6 is received by the receiver 5. The electronic circuit A supplies a new pulse signal to the generator 4 when the receiver 5 receives the reflected ultrasonic signal. That is, these circuits operate in the so-called "sing-around" manner similar to that of the FIG. 3 example. Reference characters DM and CO respectively represent an FM signal demodulator and a counter as in the foregoing examples.

The time $\tau$ for the ultrasonic signal to travel from the transmitter 4 to the vibrator 6 and then back to the receiver 5 is expressed by the following equation (4):

$$\tau = k \, D/V \tag{4}$$

where D is the distance between the transmitter 4 or receiver 5 via the vibrator 6, V the velocity of the ultrasonic signal in the fluid F and k is constant.

Figure 9A:
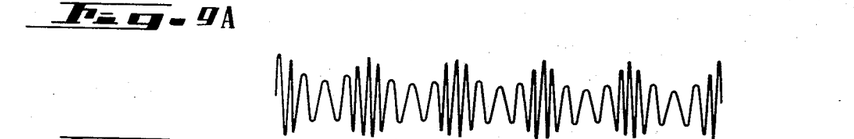
FIGS. 9A and 9B are graphs showing the output wave forms derived from the example shown in FIG. 8.
Figure 9B:
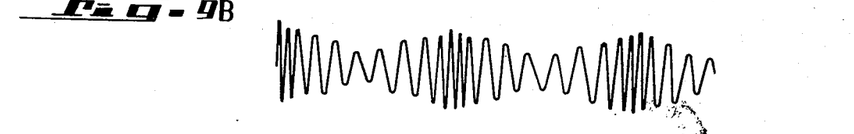

In the example shown in FIG. 8 the transmit-receive path D of the ultrasonic signal changes in accordance with the frequency of vibration of the vibrator 6, so that the time $\tau$ also changes in accordance with the vibration of the vibrator 6. The frequency of the pulses obtained from the electronic circuit A also varies according to the vibration of the vibrator 6 as shown in FIG. 9. That is to say, the produced signal Po changes in frequency or is frequency-modulated in accordance with the vibration of the vibrator 6. FIG. 9A shows the case where the velocity of the flow of the fluid F is comparatively high, while FIG. 9B shows the case where the velocity is relatively low. Since the ultrasonic signal is generally attenuated in the fluid F, the output signal Po is slightly amplitude-modulated according to the vibration of the vibrator 6 as shown in FIGS. 9A and 9B. The output signal Po from the receiver 5 is demodulated by the demodulator DM and is counted by the counter CO. The velocity of the flow of the fluid F is indicated by the output of the counter.

Figure 10A:
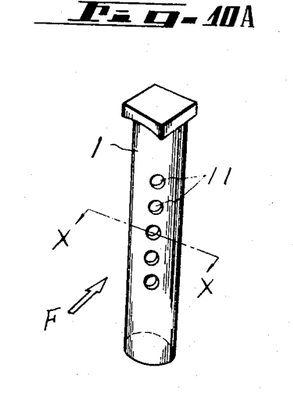
FIG. 10A is a perspective view for showing an object employed in the present invention, which is different from those shown in FIGS. 2, 6 and 8, for generating the Karman vortices.
Figure 10B:
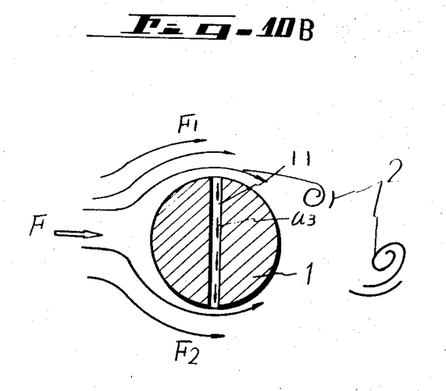
FIG. 10B is a cross-sectional view along the line X—X in FIG. 10A for illustrating the operation of the object depicted in FIG. 10A.

In FIGS. 10A and 10B there is shown another example of the vortex generating rod 1 which is immersed in the fluid F. In this example, a plurality of transverse bores 11 are formed in the vortex generating rod 1 along its axis in such a manner that the longitudinal axis of each bore 11 is parallel with each other and perpendicular to the longitudinal axis of the rod 1. When the vortex generating rod 1 is immersed in the flowing fluid, the fluid can freely pass or flow through the bores 11 in both directions to stabilize formation and shedding of the Karman vortices and also to regulate the rows of the Karman vortices. That is, as shown in FIG. 10B if the rod 1 having a plurality of bores 11 is immersed in the fluid F flowing in the conduit in such a manner that the longitudinal axis of the rod 1 is substantially at right angles to the direction of the flow of the fluid F, the fluid F striking against the rod 1 breaks into two streams $F_1$ and $F_2$ each being along the side of the rod 1 and the Karman vortices 2 are formed on the downstream side of the rod 1 at regular intervals and alternately from each side. The fluid to the bores 11 can freely pass therethrough or be forced therethrough due to the combined effects of fluid pressure, displacement of the fluid and the like near the openings of the bores 11. As a result, the flow of the fluid streams $F_1$ and $F_2$ flowing along the sides of the rod 1 are mutually influenced by the fluid flowing through the bores 11 and alternate suction and pressure on the fluid is caused at the opposite ends of the openings of the transverse bores 11. In the case where the vortex 2 is formed in the flow stream $F_1$ as shown in FIG. 10B, the fluid in the transverse bores 11 flows in the direction shown by an arrow $a_3$, so that the fluid is sucked into the bores 11 on the side of the flow stream $F_1$ while the fluid is caused to separate on the side of the flow stream $F_2$.

It is generally well known in the art that when the boundary layer of the fluid flowing on the curved surface of an object or obstacle is in a condition to readily separate itself from the surface of the object that the flow of the fluid flowing out from the opening of the bore formed in the object near the separation point facilitates the separation of the fluid from the surface of the object and that suction of the fluid into the bore serves to delay the separation of the fluid from the curved surface of the object. In other words, the suction in and ejection out of the fluid at the openings of the transverse bores effectively and positively control the formation and shedding of the Karman vortices. It is, therefore, understood that the vortex generating rod 1 which has a plurality of transverse bores 11 as shown in FIGS. 10A and 10B can stabilize the formation and shedding of the Karman vortices and regulate the rows of the Karman vortices flowing downstream and also cause the size of the Karman vortices to remain substantially constant.

FIGS. 11A to 11D, inclusive, show another example of the vortex generating rod 1. In this example reference numerals 12A and 12B represent a plurality of aligned openings formed in opposite sides of rod 1. For example, openings are formed 12A in the rod 1 on one side thereof along its lengthwise direction and the other openings 12B are formed in the rod 1 on the opposite side thereof along the lengthwise direction of the rod 1. Suction and shedding of fluid occurs alternately at the openings 12A and 12B. Reference numerals 13 and 14 designate cavities which are formed in the rod 1 along opposite sides of the longitudinal axis thereof. The openings 12A and 12B respectively, open into cavities 13 and 14. Cavity 13, for example, is adjacent the openings 12A and the other cavity 14 is adjacent the openings 12B. A partition wall 15 is formed between the cavities 13 and 14 and a bore 16 is formed in the partition wall 15 so that cavity 13 intercommunicates with the other cavity 14.

FIG. 12A to 12D, inclusive, show another example of the vortex generating rod 1 similar to that shown in FIGS. 11A to 11D. In this example reference numerals 12A' and 12B' designate respectively slits formed in the rod 1 on the opposite sides thereof. The respective slits 12A' and 12B' are provided instead of the openings 12A and 12B shown in FIG. 11. In this example a plurality of bores 16' are formed in the partition wall 15 instead of the single bore 16 in FIG. 11 example. Other construction of the device of FIG. 12 is substantially similar to that of FIG. 11.

Figure 11A:
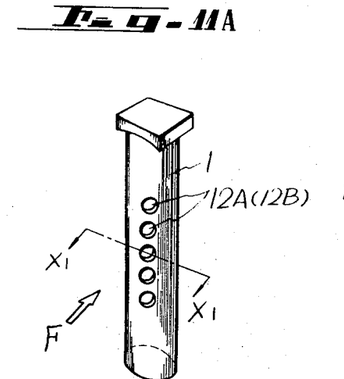
FIG. 11A is a perspective view for illustrating another example of the object employed in the present invention.
Figure 11B:
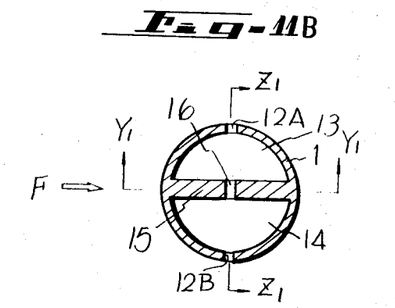
FIG. 11B is a cross-sectional view along the line $X_1—X_1$ in FIG. 11A.
Figure 11C:
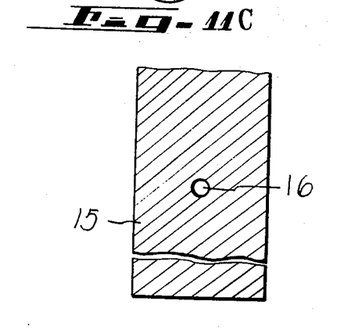
FIG. 11C is a cross-sectional view along the line $Y_1—Y_1$ in FIG. 11B.
Figure 11D:
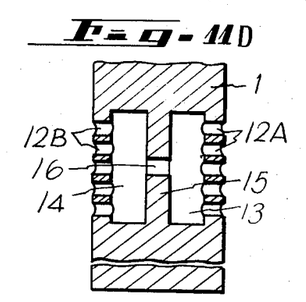
FIG. 11D is a cross-sectional view along the line $Z_1—Z_1$ in FIG. 11B.
Figure 13A:
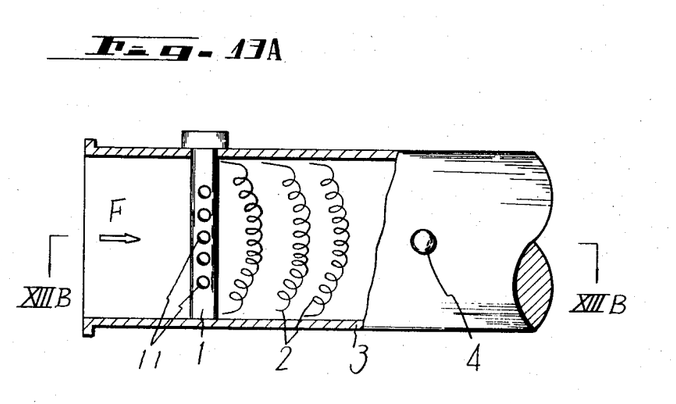
FIG. 13A is a schematic diagram similar to that of FIG. 2A in which the object depicted in FIGS. 11A to 11D is employed instead of that shown in FIG. 2A.
Figure 13B:
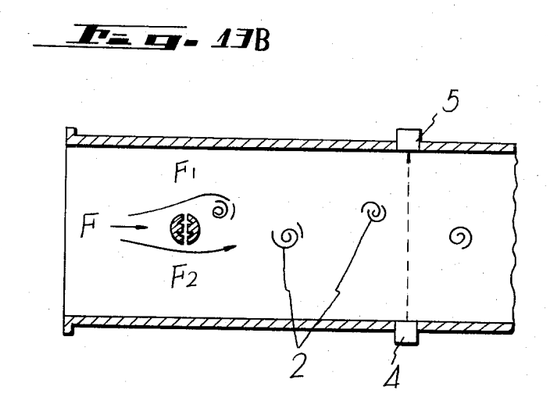
FIG. 13B is a cross-sectional view along the line XIIIB-XIIIB in FIG. 13A.

FIGS. 13A and 13B show another example of the present invention in which the vortex generating rod 1 exemplified in FIGS. 11A to 11B is employed. In the case the fluid stream striking against the rod 1 is divided into two fluid streams $F_1$ and $F_2$ with each fluid stream flowing along opposite sides of the rod 1 to form the Karman vortices. The fluid introduced into the cavities 13 and 14 through the openings 12A and 12B can be freely displaced from one cavity to the other cavity through the bore 16 and then is homogenized in the cavities 13 and 14, so that the separation condition of the boundary layer in the streams $F_1$ and $F_2$ flowing along the opposite sides of the rod 1 is controlled simultaneously by synchronized suction or shedding through openings 12A, 12B and which is averaged by the cavities. Uniform condition of vortex forming and shedding along the axis of the rod 1 and the suction and shedding of the fluid is alternately and uniformly effected on the opposite sides of the rod 1 in the axial direction of the rod 1.

With such an arrangement, due to the combined effect of the suction and shedding of the fluid through the openings 12A and 12B from the effect of making the formation of the vortices uniform along the axis of the rod 1 caused the cavities 13 and 14, the formation and shedding of the Karman vortex will be further stabilized along the axis of the rod 1. It is also stabilized on the downstream side of the rod 1, and the rows of the Karman vortices are regulated in three dimensions and the size of each Karman vortex will remain substantially constant.

Figures 12A, 12B:
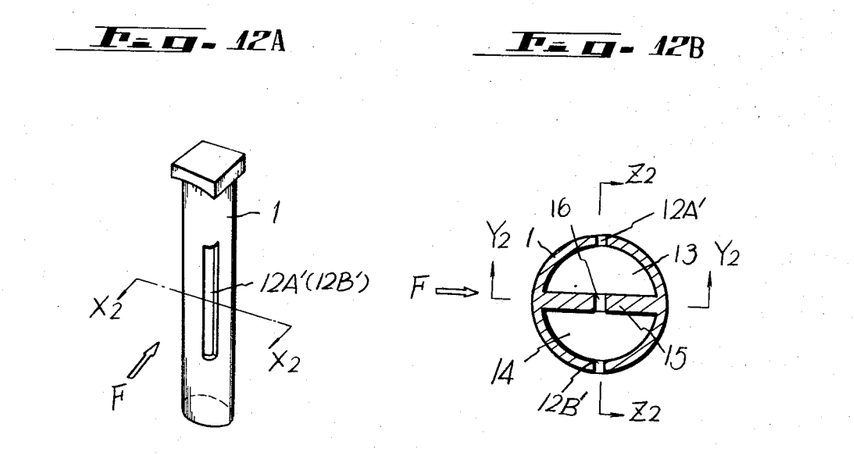
FIG. 12A is a perspective view for showing still another example of the object employed in the present invention.
FIG. 12B is a cross-sectional view along the line $X_2—X_2$ in FIG. 12A.
Figure 12C:
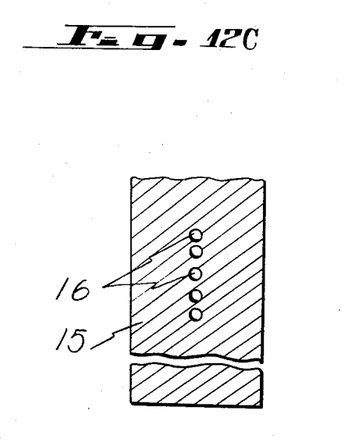
FIG. 12C is a cross-sectional view along the line $Y_1—Y_2$ in FIG. 12B.
Figure 12D:
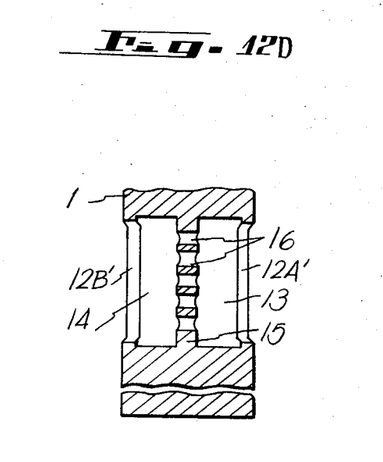
FIG. 12D is a cross-sectional view along the line $Z_2—Z_2$ in FIG. 12B.

It will be, therefore, understood that if the vortex generating rods shown in FIGS. 10 to 12 are employed in the present invention the velocity of the flow of the fluid can be positively and accurately measured.

Since the number of the Karman vortices or the number of the Karman vortices flowing downstream of the object is measured by employing the ultrasonic signal measuring apparatus which does not directly contact the fluid to be measured, the measuring apparatus does not distort the flow. Accordingly, the present invention can be used for measuring the velocity of the flow of the fluid or the quantity of the flow irrespective of the kinds of fluid such as acid or alkali being used.

Thus the present invention solves the problem of how to make the measuring apparatus corrosion proof or pressure-proof, and also make the structure very strong and accurate.

It will be apparent that many modifications and variations may be effected without departing from the scope of the novel concepts of the present invention.

We claim as our invention:

1. A current meter or flow meter comprising a conduit means through which a fluid to be measured flows, a vortex generating rod means immersed in the stream of said fluid for producing the Karman vortices, a vibrator means disposed on the downstream side of said vortex forming rod means and vibrated by said Karman vortices, an ultrasonic signal transmitter means disposed on said conduit means on the downstream side of said rod means for producing ultrasonic signals against said vibrator means, an ultrasonic signal receiver means disposed on said conduit means on the downstream side of said rod means for receiving the ultrasonic signal reflected by said vibrator means, an electronic circuit means of the so-called "sing-around" type for applying pulse signals to said ultrasonic signal transmitter means in response to the signals from said ultrasonic signal receiver means, FM demodulator means for demodulating the output of said electronic circuit means, and a counter means for counting the output signal of said FM demodulator means.

2. A current meter or flow meter as claimed in claim 1 in which said vortex generating rod means has provided therethrough a bore at the openings of which suction and shedding of said fluid occur.

3. A flow meter as claimed in claim 1 in which said vortex generating rod means has provided therein two cavities between which a partition wall is provided, said partition wall having a bore through which said two cavities intercommunicate with ach other and bores or slits, the openings of which are opened out in the surface of the vortex generating rod means at the positions from where the boundary layer of said fluid is substantially separated.

4. A flow meter comprising:
 a conduit means through which a fluid to be measured flows;
 a vortex generating rod means immersed in the stream of said fluid in said conduit means for producing Karman vortices;

an ultrasonic signal transmitter means and an ultrasonic signal receiver means mounted on said conduit means on the downstream side of said vortex generating rod means in such a manner that a line connecting said ultrasonic signal transmitter means and receiver means is substantially at right angles to the direction of flow of said fluid and also the axis of said vortex generating rod means, an ultrasonic signal emitted from said ultrasonic signal transmitter means travelling through said fluid to said ultrasonic signal receiver means over a path coincident with said connecting line, detector means connected to said receiver means and receiving a signal therefrom and processing it to demodulate the intelligence on said signal indicative of velocity of said fluid;

a counter means receiving the output of said detector means to produce an output indicative of the velocity of said fluid output;

and further including a "sing-around" circuit for pulsing said ultrasonic signal at a frequency inversely proportional to the travel time of said ultrasonic signal in said fluid, said sing-around circuit applying said pulsed ultrasonic signal to said ultrasonic signal transmitter in response to signals from said ultrasonic signal receiver, said detector means comprises an FM signal demodulator for demodulating outputs from said sing-around circuit, and said counter means connected to said FM signal demodulator and counting output pulses to indicate the velocity of said fluid.

5. A flow meter comprising:

a conduit means through which a fluid to be measured flows;

a vortex generating rod means immersed in the stream of said fluid in said conduit means for producing Karman vortices;

an ultrasonic signal transmitter means and an ultrasonic signal receiver means mounted on said conduit means on the downstream side of said vortex generating rod means in such a manner that a line connecting said ultrasonic signal transmitter means and receiver means is substantially at right angles to the direction of flow of said fluid and also the axis of said vortex generating rod means, an ultrasonic signal emitted from said ultrasonic signal transmitter means travelling through said fluid to said ultrasonic signal receiver means over a path coincident with said connecting line, detector means connected to said receiver means and receiving a signal therefrom and processing it to demodulate the intelligence on said signal indicative of velocity of said fluid;

a counter means receiving the output of said detector means to produce an output indicative of the velocity of said fluid output;

further including a vibrator means disposed on the downstream side of said vortex generating rod means and vibrated by said Karman vortices, said detector and counter means counting the number of interruptions of said ultrasonic signal by said vibrator;

and in which said ultrasonic signal transmitter emits said ultrasonic signal against said vibrator means and said ultrasonic signal receiver receives said ultrasonic signal after it has been reflected by said vibrator means.

6. A flow meter comprising:

a conduit means through which a fluid to be measured flows;

a vortex generating rod means immersed in the stream of said fluid in said conduit means for producing Karman vortices;

an ultrasonic signal transmitter means and an ultrasonic signal receiver means mounted on said conduit means on the downstream side of said vortex generating rod means in such a manner that a line connecting said ultrasonic signal transmitter means and receiver means is substantially at right angles to the direction of flow of said fluid and parallel to the axis of said vortex generating rod means, an ultrasonic signal emitted from said ultrasonic signal transmitter means travelling through said fluid to said ultrasonic signal receiver means over a path coincident with said connecting line;

a vibrator means disposed on the downstream side of said vortex generating rod means and mounted on an axis parallel thereto and vibrated transversely of said conduit means by said Karman vortices;

a detector means connected to said ultrasonic signal receiver means and receiving a signal therefrom and processing it to demodulate the intelligence on said signal indicative of the velocity of said fluid;

a counter means receiving the output of said detector means to produce an output indicative of the velocity of said fluid;

wherein the said vortex generating rod means has provided therein two cavities which are separated by a partition wall, said partition wall having a bore transverse to the direction of fluid flow in said conduit means through which said cavities intercommunicate with each other, and openings which open out to the surface of the vortex generating rod means at positions transverse to the direction of fluid flow in said conduit means from which the boundary layer of said fluid tends to separate from said surface; and in which said ultrasonic signal transmitter means emits said ultrasonic signal against said vibrator means and said ultrasonic signal receiver means receives said ultrasonic signal after it has been interrupted by said vibrator means.

* * * * *